MASANARI MATSUSHITA,
Inventor

United States Patent Office 3,684,471
Patented Aug. 15, 1972

3,684,471
PROCESS AND APPARATUS FOR PRODUCTION OF GLASS RIBBON ON MOLTEN METAL BATH
Masanari Matsushita, Maizuru, Japan, assignor to Nippon Sheet Glass Co., Ltd., Osaka, Japan
Filed Oct. 20, 1970, Ser. No. 82,393
Int. Cl. C03b 18/00
U.S. Cl. 65—91     10 Claims

ABSTRACT OF THE DISCLOSURE

Process and apparatus for producing glass ribbon having a thickness different from the equilibrium thickness by pouring molten glass onto a molten metal bath, advancing it over the bath and solidifying it by cooling, wherein the width of the glass ribbon is controlled by using rotors of an electrically conductive refractory material having a plurality of projections and disposed at each of the side edges of the molten metal bath at a predetermined angle to the advancing direction of the glass ribbon, which rotors are connected to an electric source and adapted to hold both side edges of the glass ribbon in its cooled but plastic state and either increase or reduce the width of the glass ribbon.

---

This invention relates to an improved process and apparatus for continuous production of a glass ribbon having a thickness different from the equilibrium thickness by pouring molten glass onto a bath of molten metal, advancing it over the bath and solidifying it by cooling.

When a molten glass is poured onto a bath of molten metal at a certain rate and continuously advanced over the molten metal bath at a certain rate, a glass ribbon of a certain equilibrated thickness is produced according to the temperature of the molten glass. One way to produce a glass ribbon having a thickness different from the equilibrated thickness is to control the temperature of the glass ribbon on the molten metal bath or the rate of advancing the glass ribbon. For obtaining a glass ribbon having a sufficient width under stable operating conditions, however, there is a certain limit on the aforementioned temperature of rate. This leads to the difficulty of producing a glass ribbon having a thickness considerably different from the equilibrium thickness.

There has been proposed an apparatus for producing a glass ribbon having a thickness smaller than the equilibrium thickness, in which a rotor to be rotated by a drive device is provided above both side edge portions of a glass ribbon still in a palstic state and advancing on the bath so that the rotor rotates in a direction inclined against the advancing direction of the glass, and the rotor is driven in contact with the glass ribbon whereby the glass ribbon is pulled out in the widthwise direction and its thickness is reduced (British Pat. 1,085,010). However, when the rotor is driven at a portion of the glass ribbon which is at a relatively low temperature, the rotor does not mesh with the glass ribbon, and sometimes undergoes slippage. Hence, the side portion of the glass ribbon is not pulled out in the rotating direction of the rotor, and the rotor cannot be used effectively. Hence, the temperature range of the glass ribbon within which such a rotor can be used as limited.

Accordingly, a primary object of the present invention is to provide a process and an apparatus by which a rotor can be rotated without slippage even with a glass ribbon having a relatively low temperature on a molten metal bath.

According to the present invention, there is provided a process for continuously producing a glass ribbon having a thickness different from the equilibrium thickness which comprises continuously flowing out a molten glass in a ribbon-like form onto a supporting bath of molten metal, advancing the molten glass ribbon over said molten metal bath, contacting both side edges of the upper surface of the cooled glass ribbon still in a plastic state with electrically conductive rotors for controlling the width of the glass ribbon which are rotatably disposed at a predetermined angle to the advancing direction of the glass ribbon, supplying electric power between the electrically conductive rotors and the molten metal bath which is sufficient to heat said glass ribbon to a temperature sufficient to cause adhesion between the glass ribbon and the rotors without slippage, and then drawing out the glass ribobn having a certain thickness different from the equilibrium thickness from the molten metal bath.

In the present specification, the equilibrium thickness of a glass ribbon is defined as the thickness of a glass ribbon obtained by pouring out a molten glass over a bath of molten metal, allowing it to freely spread in a ribbon-like form on the molten metal bath under the influence of its gravity and surface tension, allowing it to cool and solidify while advancing over the bath in this state, and drawing out the glass ribbon from the molten metal bath at a certain rate. Usually, this equilibrium thickness is about 6.8 mm.

The invention is particularly useful for production of a glass ribbon having a thickness smaller than the equilibrium thickness, but is also applicable to the production of a glass ribbon having a thickness larger than the equilibrium thickness.

Any rotors can be used which are rotatable about the axis and capable of being meshed with the side edges of the glass ribbon and which can conduct electricity to the glass ribbon. Preferred are those having a resistance value smaller than that of a glass ribbon to be heated. Suitable rotors are made of electrically conductive refractory materials, such as graphite. Some examples of such rotors are those fitted rotatably about a fixed shaft, and those fixed to a shaft. The rotors may be positively driven. Or they may themselves not be driven but be rotated by the movement of the glass ribbon in contact with the side edges of the glass ribbon.

A number of projections are provided on the periphery of the rotor for ensuring engagement with the side edges of the glass ribbon. The projections are preferably in the form of saw teeth, and have a tip angle of 10–90° C. When the tip angle is less than 10°, the projections are thrust excessively into the surface portion of the plastic glass ribbon, and tend to adhere excessively to the glass ribbon. If, on the other hand, the tip angle is above 90°, the projections find it hard to thrust into the surface portion of the glass ribbon, and therefore, the rotors tend to undergo slippage. It is preferred that the number of the projections to be thrust into the glass ribbon should be 2 to 4.

The preferred examples of the rotors are described in the applicants' copending application.

The rotors are provided above both side edges of the glass ribbon. A straight line formed of the surface of the glass ribbon and a plane crossing the axis of the rotor at right angles to it should form an angle of not more than 45° with the advancing direction of the glass ribbon, preferably an angle of 5 to 45°. It is preferable that each pair of the rotors on both sides of the glass ribbon should be directed in substantially the same direction at substantially the same angle. When it is desired to obtain a glass ribbon having a final thickness smaller than the equilibrium thickness by enlarging the width of the glass ribbon, the rotors are provided above both sides of the glass ribbon in a diverging fashion at the above-specified angles. In this case, each rotor has an angle outwardly of the advancing direction of the glass ribbon. On the other hand, when it is desired to obtain a glass ribbon having a final thickness larger than the equilibrium thickness by narrowing the width of the glass ribbon, the rotors are disposed on both side of the glass ribbon in a converging fashion (each rotor has an angle inwardly of the advancing direction of the glass ribbon).

At a time when a glass ribbon on the molten metal bath is cooled and is still in a plastic state with a high viscosity, electrically conductive rotors are contacted with the glass ribbon, and electric power is supplied between the electrically conductive rotors and the molten metal bath. It is important in this invention that the rotors are used when the glass ribbon is in a plastic state but has high viscosity. By this procedure, it is possible to heat the glass ribbon at portions which come into contact with the rotors. The rotors come into engagement with the glass ribbon without slippage, and the control of the width, namely thickness, of the glass ribbon can be effectively performed.

It is advantageous in this invention that the rotors are contacted with the side edge portions of a glass ribbon held at a temperature in the range 650° C. to 800° C. The current to be flowed between the rotors and the molten metal bath may be D.C. or A.C., the latter being particularly preferred. The electric power varies depending upon the temperature of the glass ribbon. Generally, the proper range is 50 watt to 5 kilowatt, preferably about 1 kilowatt per rotor. The electrical power necessary for causing the rotors to adhere to the glass ribbon without slippage can be selected experimentally from the above-mentioned range.

The process of the invention can be readily carried out by using an apparatus for continuous production of a glass ribbon having a thickness different from the equilibrium thickness including a bath of molten metal for supporting a molten glass ribbon supplied from the inlet for molten glass and advancing and cooling the glass ribbon, a tank containing said molten metal bath, a mechanism for controlling the width of the glass ribbon comprising shafts and rotors mounted on said shafts and having a plurality of projections on their periphery which come into engagement with the side edges of the glass ribbon, and a transfer roll provided on the outlet side of the molten metal bath for drawing out the glass ribbon, said width controlling mechanism being provided at each of the edges of the molten metal bath so that it comes into engagement with both side edge portions of the upper surface of the glass ribbon cooled and still in a plastic state, each of said rotors being supported rotatably at a certain angle to the advancing direction of the glass ribbon and being constructed of an electrically conductive refractory material, said rotors and molten metal bath being connected to an electric source for heating said glass ribbon to a temperature sufficient to cause the glass ribbon to adhere to the rotors without slippage.

For facilitating the understanding of the invention, reference may be made to the accompanying drawings in which.

Figure 1:
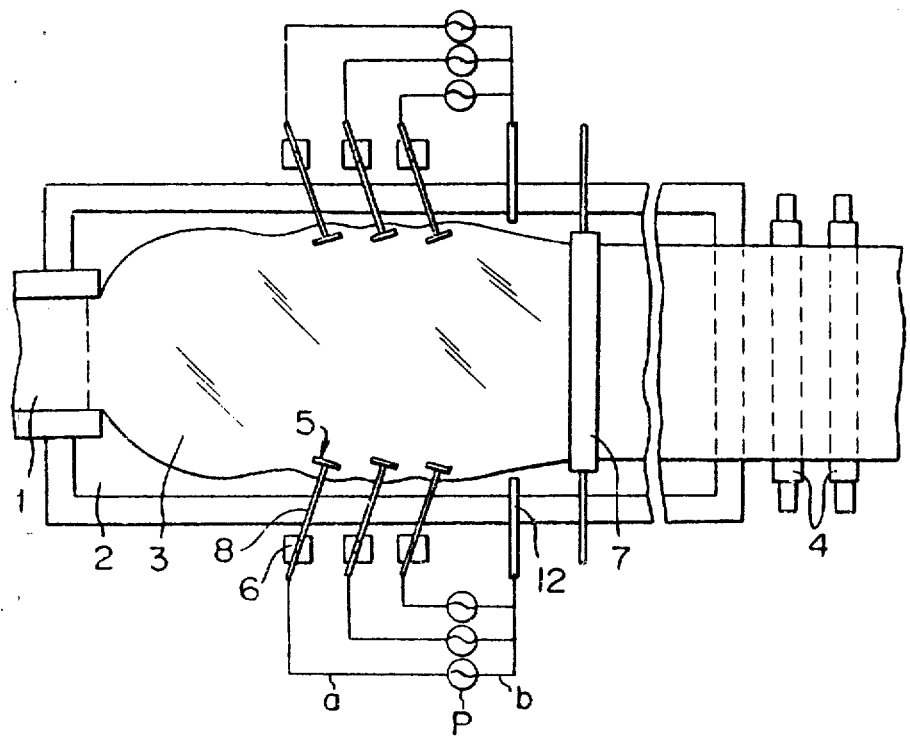
FIG. 1 is a plan view of one embodiment of the apparatus of the invention.

Referring to FIG. 1, molten glass melted in a melting furnace (not shown) passes through an inlet 1 for a stream of glass, and is poured out onto a bath 2 of molten metal consisting of tin or tin alloy to form a glass ribbon 3. The glass ribbon advances on the molten metal bath 2 by being pulled by a transfer roll 4. Generally, the equilibrium thickness of a glass ribbon on a molten metal bath is about 6.8 mm. when the operating conditions are normal without applying an external force to the glass ribbon. In order to produce a glass ribbon having a thickness smaller than the equilibrium thickness, the glass ribbon 3 is pulled by the transfer roll 4 to elongate it in the advancing direction, and the glass ribbon 3 is elongated in the widthwise direction by rotors 5 which are provided above the side edges of the upper surface of the glass ribbon 3 in contact with the glass ribbon 3 and are capable of rotating freely about the axis. In the embodiment shown in FIG. 1, three rotors are provided successively in the advancing direction of the glass ribbon on each side thereof at the parts where in the absence of the rotors the glass ribbon 3 is pulled by the transfer roll 4 to reduce its width. At this time, the temperature of the glass ribbon with which the rotors come into contact is from 750 to 800° C. The rotors 5 are supported by a supporting apparatus 6 electrically insulated from the earth in an optional length and at an optional angle. In the present embodiment, a straight line formed by the surface of the ribbon glass and a plane crossing the shaft of the rotor at right angles thereto forms an outward angle of about 20° to the advancing direction of the glass ribbon. The glass ribbon 3 having its thickness reduced in this manner is cooled by a cooler 7 provided over the glass ribbon so that the deformation of the glass ribbon 3 will be avoided as much as possible thereafter.

Figure 2:
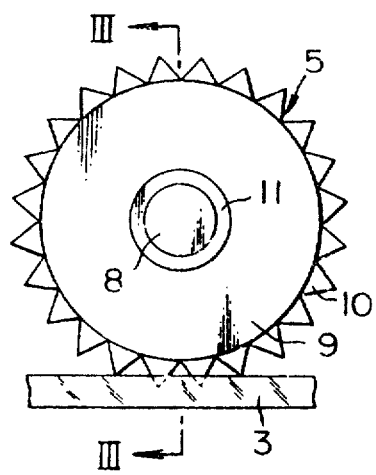
FIG. 2 is a front elevation of the rotor used in the apparatus shown in FIG. 1.
Figure 3:
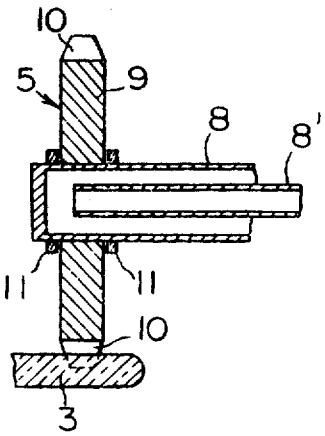
FIG. 3 is a sectional view taken along the line III—III of FIG. 2.

As illustrated in FIGS. 2 and 3, each of the rotors consists of a fixed shaft portion 8 made of an electrically conductive metal and a rotary portion 9 of graphite capable of rotating about the shaft portion. The fixed shaft part 8 is of a double pipe structure. Cooling water is supplied from its inner pipe 8', and discharged from between the two pipes. On the periphery of the rotary portion 9 are provided a number of projections 10 made of electrically conductive graphite for plucking the glass ribbon 3, and a stopper 11 for preventing the movement of the rotary portion 9 in the axial direction is fixed to the fixed shaft portion 8.

The fixed shaft portion 8 and the rotary portion 9 are made of an electrically conducting material. The fixed portion 8 and an electrode 12 immersed in the molten metal bath 2 are connected to an electric source P through lead wires $a$ and $b$, as illustrated in FIG. 1. A D.C. or A.C. voltage of 30–50 volts is applied, and a current of 20–30 amperes is passed.

When electric current is not passed, the temperature of the glass ribbon 3 with which the rotors 5 come into contact is relatively low, the projections 10 of the rotor 5 do not thrust into the glass ribbon 3, but push it downwards, with the result that the rotor 5 does not rotate smoothly. But when electric voltage is applied, electric current flows through a part of the glass ribbon 3 which is near a part with which the rotor 5 comes into contact, and Joule heat is generated to bring about a temperature rise of 50–100° C. The temperature of the glass ribbon at this part is elevated, and the rotor 5 becomes readily adhered to the glass ribbon 3 and smoothly rotates with the advancing of the glass ribbon 3.

When the temperature of the glass ribbon 3 is elevated excessively, the adhesion between the rotor 5 and the glass ribbon 3 becomes firmer than desired, and the glass ribbon does not depart from the rotor to prevent the advancing of the glass ribbon. It is necessary therefore to control the temperature of the glass ribbon at the part with which the rotors come into contact to a pretty precise extent. The temperature control can be effected by controlling the voltage or current. The process of the invention is advantageous in that this control can be performed very easily. At a part of the glass ribbon which has a relatively high temperature, thet temperature of the glass ribbon at a part near that with which the rotors come into contact is reduced by a cooling device or the like, and then the process of the present invention is utilized to control the temperature of this part of the glass ribbon meticulously. Thus, according to this embodiment, a flat glass having a thickness of about 2 mm. can be produced.

Although not shown in the drawings, a known constant-current device may be used, and an electric source of a certain current, for instance, current of 30 ampere, is connected to the rotor 5 and the electrode 12. When in this state, the temperature of the part of the glass ribbon 3 which comes into contact with the rotor 5 drops, the electrical resistance of this part of the glass ribbon 3 becomes large and hence the electric voltage becomes high, which in turn results in an increased Joule heat generated in the glass ribbon. When, on the contrary, the temperature of this part of the glass ribbon rises, the Joule heat is decreased. Thus, it is possible to control the degree of adhesion between the rotor 5 and the glass ribbon 3, namely, the temperature of this part of the glass ribbon with simplicity and ease. Furthermore, when that part of the glass ribbon 3 which comes into contact with the rotor 5 approaches the side edges of the glass ribbon owing to a reduction in the width of the glass ribbon or by the zigzag movement of the glass ribbon 3 over the molten bath 2, the generation of Joule heat becomes vigorous because the side edges of the glass ribbon generally have a lower temperature than the other parts. Thus, the aforementioned adhesion tends to occur, and a force to move the glass ribbon 3 outwardly at this part acts more effectively. In other words, by connecting the rotor 5 and the electrode 12 to an electric source of a constant current, it is possible to maintain the position of the glass ribbon 3 constant.

The position of the glass ribbon can be electrically measured by utilizing the fact that this part of the glass ribbon 3 is an electrically conducting body. Thus, the position of the glass ribbon 3 can be maintained constant by varying the voltage and current according to the results of measurement. If contrivance is made so that when the width of the glass ribbon 3 is reduced, the voltage or current increases automatically and the generation of Joule heat of the glass ribbon 3 becomes vigorous, the adhesion becomes easier to effect and the width of the glass ribbon 3 is enlarged with increasing efficiency to return the glass ribbon to the original position.

In the foregoing embodiment, the width of the glass ribbon is elongated by using rotors rotatable about the shafts. The rotors may be rotated by a drive device. The process of the present invention is applicable even if the rotors are used for reducing the width of the glass ribbon or control its position.

Figure 4:
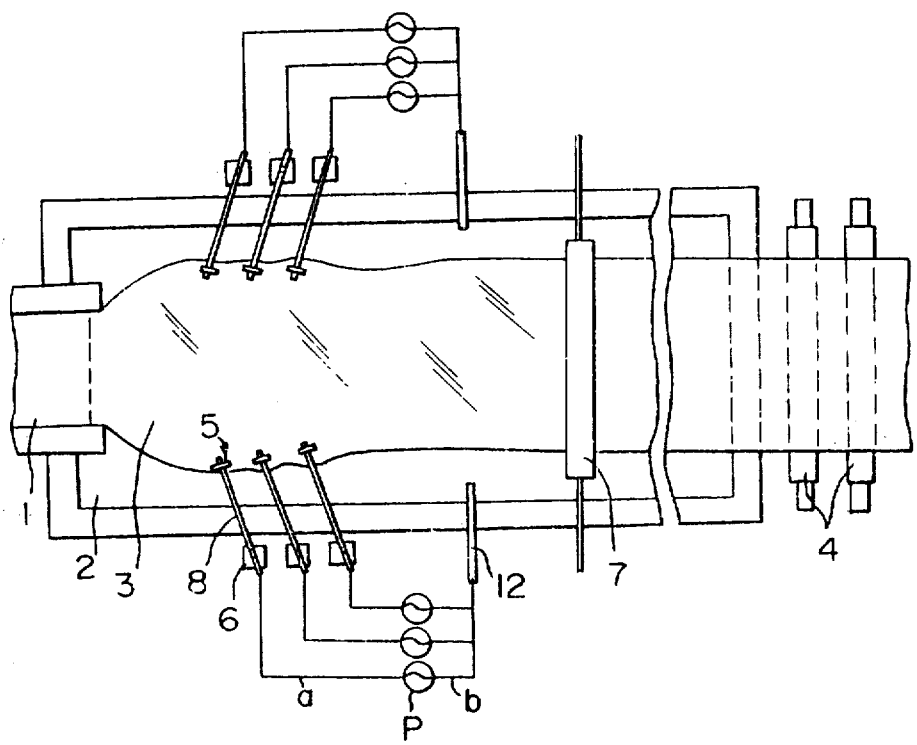
FIG. 4 is a plan showing another embodiment of the apparatus of the invention.

FIG. 4 illustrates a specific embodiment for producing a glass ribbon having a thickness larger than the equilibrium thickness by controlling the widthwise spreading of the glass ribbon. For the simplicity of description, the parts common to those in FIG. 1 are shown by the same reference numerals. The rotating direction of the rotor 5 forms an angle of about 20° inwardly to the advancing direction of the glass ribbon 3. The operation is the same as shown in FIG. 1 except that this rotor pushes the spreading glass ribbon and thus reduces its width. Reduction in width leads to a larger thickness of the glass ribbon. According to this embodiment, a flat glass having a thickness of 12 mm. is produced.

What is claimed is:

1. A process for continuously producing a glass ribbon having a thickness different from the equilibrium thickness which comprises continuously flowing out a molten glass in a ribbon-like form onto a supporting bath of molten metal, advancing the molten glass ribbon over said molten metal bath, contacting both side edges of the upper surface of the cooled glass ribbon still in a plastic state with electrically conductive rotors for controlling the width of the glass ribbon which are rotatably disposed at a predetermined angle to the advancing direction of the glass ribbon, supplying electric power between the electrically conductive rotors and the molten metal bath which is sufficient to heat said glass ribbon in contact with the rotors to a temperature sufficient to cause adhesion between the glass ribbon and the rotors without slippage and then drawing out the glass ribbon having a certain thickness different from the equilibrium thickness from the molten metal bath.

2. A process according to claim 1 wherein the electrically conducting rotors are contacted with a glass ribbon having a temperature of 650 to 850° C.

3. A process according to claim 1 wherein electric power of 50 watt to 5 kilowatt for each conducting rotor is supplied between the molten metal bath and the electrically conducting rotors.

4. A process according to claim 1 wherein said rotors are contacted with the glass ribbon so that a straight line formed by the surface of the glass ribbon and a plane crossing the shafts of the rotors at right angles thereto forms an angle of 5–45° with the advancing direction of the glass ribbon.

5. An apparatus for continuous production of a glass ribbon having a thickness different from the equilibrium thickness including a bath of molten metal for supporting a molten glass ribbon supplied from the inlet for molten glass and advancing and cooling the glass ribbon, a tank containing said molten metal bath, a mechanism for controlling the width of the glass ribbon comprising shafts and rotors mounted on said shafts and having a plurality of projections on their periphery which come into engagement with the side edges of the glass ribbon, and a transfer roll provided on the outlet side of the molten metal bath for drawing out the glass ribbon, said width controlling mechanism being provided at each of the edges of the molten metal bath so that it comes into engagement with both side edge portions of the upper surface of the glass ribbon cooled and still in a plastic state, each of said rotors being supported rotatably at a certain angle to the advancing direction of the glass ribbon and being constructed of an electrically conductive refractory material, said rotors and molten metal bath being connected to means to provide electric power for heating said glass ribbon to a temperature sufficient to cause the glass ribbon to adhere to the rotors without slippage.

6. An apparatus according to claim 5 wherein said rotors are disposed on the sides of a glass ribbon having a temperature in the range of 650 to 850° C.

7. An apparatus according to claim 5 wherein said rotors are freely rotatably mounted on said shaft to rotate freely with the movement of the glass ribbon.

8. An apparatus according to claim 5 wherein said rotors are made of graphite and have saw tooth-like projections on their periphery.

9. An apparatus according to claim 5 wherein said rotors are provided at an angle such that a straight line formed by the surface of the glass ribbon and a plane crossing the shafts of the rotors at right angles thereto forms an angle of 5–45° with the advancing direction of the glass ribbon.

10. An apparatus according to claim 5 wherein the rotors are disposed in a diverging fashion.

References Cited

UNITED STATES PATENTS 3,493,359   2/1970   Lawrenson ---------- 65—182 R
3,533,773   10/1970  Fujimoto et al. ------- 65—99 A ROBERT L. LINDSAY, JR., Primary Examiner U.S. Cl. X.R.

65—99 A, 182 R, 355, DIG 4